UNITED STATES PATENT OFFICE.

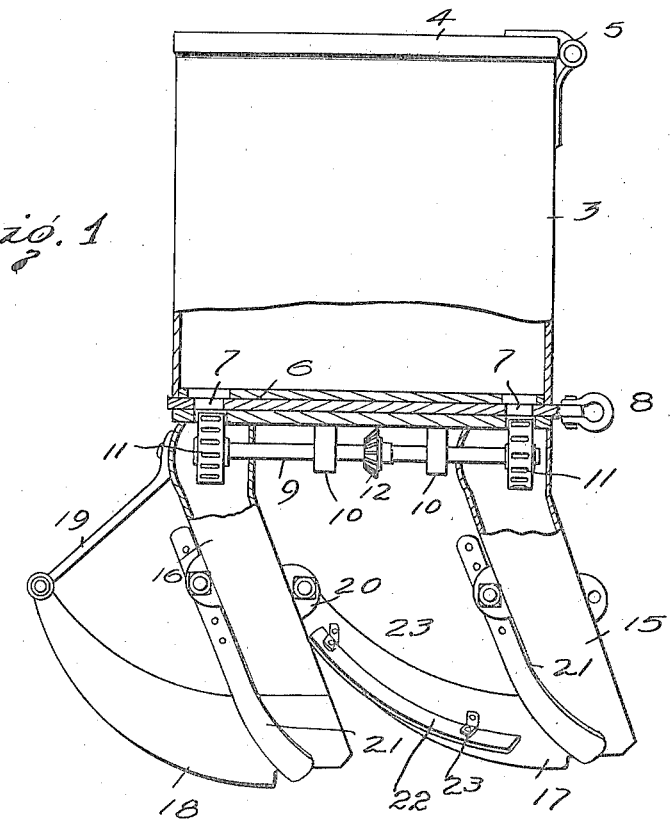
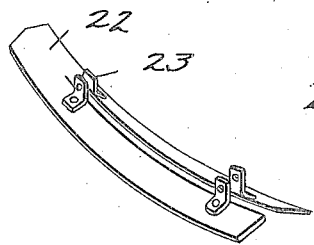

GROVER ROYER, OF EDMOND, OKLAHOMA.

PLANTER.

1,291,164.  Specification of Letters Patent.  Patented Jan. 14, 1919.

Application filed March 8, 1917. Serial No. 153,338.

*To all whom it may concern:*

Be it known that I, GROVER ROYER, a citizen of the United States, and resident of Edmond, in the county of Oklahoma and State of Oklahoma, have invented certain new and useful Improvements in Planters, of which the following is a specification.

This invention relates to planters.

The dominant object of the invention is to provide an improved cotton planter which will plant a plurality of layers of seeds, the said layers being arranged at varying depths thus, insuring growth of a full crop irrespective of the condition of the soil at the time of planting.

Another object of the invention is to provide means for covering the various layers of seed immediately subsequent to the dropping of the same into the furrows made therefor by the shovel of the seed boots.

The improvements in the details and arrangements of parts will be apparent from an inspection of the accompanying drawings, in connection with the specific description hereinafter contained, and wherein the preferred embodiment of the invention is disclosed for the purpose of imparting a full understanding of the same.

In the drawings:

Figure 1 is a vertical transverse section through the seed hopper showing the arrangement of the same with relation to the seed dropping mechanism; and Fig. 2 is a detail in perspective of one of the furrow covering blades.

Similar characters of reference are employed in all of the above described views to indicate corresponding parts.

Referring now more particularly to the several figures of the said drawings, the invention is applicable to the usual planter. A plurality of seed discharging openings are formed within the double walled bottom of the seed hopper 3 and are preferably arranged longitudinally of the same. A slidable gage 6 is received between the double walled bottom of the seed hopper and has a plurality of longitudinally disposed openings 7 formed therein, the said openings being adapted for alinement with the seed discharging openings formed within the seed hopper bottom. To facilitate moving of the several gages 6 to various adjusted positions, finger pieces 8 are arranged upon certain of the extremities thereof.

A shaft 9 is mounted in suitable bearings 10 longitudinally of the seed hopper 3 and carries upon its opposite extremity seed receiving and dropping wheels 11, the peripheries of which have a series of pockets formed therein. A bevel gear 12 is carried upon each shaft 9, preferably, intermediate its ends and is rotated through a conventional form of driving means not shown. Obviously, upon rotation of the seed receiving and dropping wheels 11, a predetermined number of seeds will be permitted to drop into the various peripherally disposed pockets thereof, whereupon, they will be immediately discharged therefrom into the furrows as made by the seed boot shovel, which will be presently described. The amount of seed as deposited within each of the peripherally disposed pockets of the wheels 11 may be regulated by adjusting the gage 6.

Seed boots 15 and 16 are secured to the under sides of the seed hopper 3, directly beneath the longitudinally disposed seed discharging openings formed therein. Upon the lower extremities of each of the boots 15 and 16, earth working shovels 17 and 18 are arranged, the free extremity of the forward shovel 18 being braced in position by means of a rod 19 while the forward extremity of the shovel 17 is secured to an apertured lug 20 through the medium of a suitable fastening device, the said lug being formed upon the seed boot 16 at a point substantially intermediate its ends. The seed boot 16 is of a length greater than the boot 15 and as a consequence, the earth working shovel 18 as carried thereby will open a furrow somewhat deeper than the furrow which is opened by the shovel 17 of the boot 15. Hence, that seed as dropped through the boot 16 will be planted at a depth greater than those as dropped from the boot 15.

As means for covering the furrow opened by the shovel 18, I secure to the boot 16 thereof a twisted blade 21 having a series of openings formed in the upper portion thereof whereby the same may be adjusted to various positions with relation to its respective boot 16 and to the surface of the soil. Upon the following shovel 17 there is arranged a longitudinally slotted blade 22 having divergent side walls and being secured to the said shovel 18 by means of a plurality of brackets 23 carried thereby, which brackets receive through suitable openings formed therein suitable fastening devices. A second twisted blade 21 is secured to the seed boot 15, at a point substantially intermediate its ends and serves to direct the loose soil adjacent the sides of the furrow opened by the shovel 17 thereinto subsequent to the dropping of the seeds therein.

In operation, the shovels 17 and 18 by being drawn through the earth will open suitable furrows therein into which seed from the boots 15 and 16 will be dropped. The twisted blade 21 as arranged upon the boot 16 will direct such loose earth as may be adjacent the sides thereof into the furrow while the covering blade 22 arranged upon the shovel 17 will efficiently fill or cover the same. The furrow made by the shovel 17 will be partially covered through the medium of the twisted blade 21 secured to its respective seed boot 15. By adjusting the twisted blade 21 relative to the depth of the soil raised by the shovels 17 and 18, the amount of soil directed from the sides of the furrows thereover may be of course regulated by the operator. Further, if so desired, the divergent side walls of the packing blade 22 may be widened to increase the deposit of earth over the furrows subsequent to the engaging of the forward twisted blade therewith.

Since it is well known in the agricultural art, that if the soil is dry, the seed must be planted deep enough to have moisture to permit germinating thereof, it is apparent that with my improved planter the growth of a full crop is practically insured. It is also known in the art, that if rains fall sufficiently to pack the upper crust of the soil, the germination cannot force its way through and as a consequence, the planting operation must be repeated. In this event, the layer of seed as planted in proximity of the surface of the soil would possess sufficient strength to allow the same to force itself upwardly through the packed soil.

Obviously, the construction shown is capable of considerable modification and such modification as is within the scope of my claims, I consider within the spirit of my invention.

I claim:

1. In a planter, a seed hopper, seed dropping mechanism operatively associated with said hopper, seed boots of different lengths arranged longitudinally of the hopper and adjacent said dropping mechanism, twisted furrow covering blades adjustably secured to the boots, and a longitudinally slotted packing blade affixed to one of the seed boots, as and for the purpose set forth.

2. In a planter, a seed hopper, seed dropping mechanism operatively associated with said hopper, seed boots of different lengths arranged longitudinally of the hopper adjacent said dropping mechanism, twisted furrow covering blades adjustably secured to portions of the seed boots and projecting into engagement with the soil, and a longitudinally slotted blade having divergent side walls secured to one of the seed boots, as and for the purpose set forth.

In testimony whereof, I affix my signature hereto.

GROVER ROYER.